United States Patent

Saito et al.

[11] Patent Number: 5,746,951
[45] Date of Patent: May 5, 1998

[54] PROCESS FOR PRODUCTION OF MAGNETIC RECORDING MEDIUM

[75] Inventors: Kazuo Saito; Takeshi Ishimatsu, both of Tokyo, Japan

[73] Assignee: Nisshinbo Industries, Inc., Tokyo, Japan

[21] Appl. No.: 387,558

[22] Filed: Feb. 13, 1995

[30] Foreign Application Priority Data

Feb. 28, 1994 [JP] Japan .................... 6-054649

[51] Int. Cl.$^6$ .................................................... C01B 31/00
[52] U.S. Cl. ........................................ 264/29.1; 264/29.6
[58] Field of Search ............................. 264/29.1, 29.6

[56] References Cited

U.S. PATENT DOCUMENTS 5,152,941 10/1992 Takaku et al. ..................... 264/29.6
5,180,529 1/1993 Takaku et al. ..................... 264/29.6

Primary Examiner—Christopher A. Fiorilla
Attorney, Agent, or Firm—Kubovcik & Kubovcik

[57] ABSTRACT

A process for producing a substrate for magnetic recording medium, which includes molding into an appropriate shape a polycarbodiimide resin or a composition mainly containing a polycarbodiimide resin, carbonizing the shaped material, and processing the carbonized shaped material into a substrate for magnetic recording medium.

2 Claims, No Drawings

PROCESS FOR PRODUCTION OF MAGNETIC RECORDING MEDIUM

BACKGROUND OF THE INVENTION (1) Field of the Invention

The present invention relates to a substrate for magnetic recording medium as well as to a process for producing said substrate. More particularly, the present invention relates to a substrate for magnetic recording medium useful for recording apparatuses of, for example, computer, data processor and the like, as well as to a process for producing said substrate.

(2) Prior Art

As well known, aluminum (Al) alloys (which are a non-magnetic material) have been in wide use as a material for a substrate for magnetic recording medium such as a magnetic disc, and magnetic discs using such an Al alloy substrate are popular. An example of such discs is one obtained by forming, on an aluminum-magnesium (Al-Mg) alloy substrate, a nickel-phosphorus (Ni-P) layer by electroless plating, and forming thereon a chromium (Cr) layer, a cobalt (Co) alloy layer and a carbon (C) protective layer in this order by sputtering.

In recent years, there have become popular magnetic recording media having a higher recording density, obtained by forming, on a glass substrate (having a very smooth surface), a Cr layer, a Co alloy layer and a C protective layer in this order by sputtering. Recently, there have also appeared magnetic recording media obtained by forming a thin magnetic layer in the same manner as above, on a vitreous carbon made from a phenol-formaldehyde resin.

Thus in recent magnetic recording and regeneration apparatuses, there are required a large recording capacity and, therefore, a small size and a light weight. Conventional sabstrate for magnetic recording media, however, are unable to satisfy such market needs, and development of a new substrate for magnetic recording medium has been desired.

The above-mentioned Al-Mg alloy substrate has a large specific gravity (about 2.6) and moreover is difficult to reduce its thickness to 1 mm or less; therefore, the substrate and the recording apparatus using the substrate cannot be made small and lightweight. The above-mentioned glass substrate can be made so as to have a thickness of 1 mm or less, but has a large specific gravity of about 2.5 and is not suitable for small size and light weight.

In Japanese Patent Application Kokai (Laid-Open) No. 52116/1991, there is described a process for obtaining a magnetic recording medium of relatively light weight (specific gravity=1.85) by subjecting a phenol-formaldehyde resin to press molding, firing and carbonizing the molded material to obtain a vitreous carbon substrate, and refiring the substrate at 2,000° C. or higher at 1,000 atm or higher to reduce pores. This process, however, uses complicated steps and requires a high temperature (2,000° C. or higher) and a high pressure (1,000 atm or higher), resulting in a high cost; moreover, the substrate produced from a phenol-formaldehyde resin has pores (surface defects) remaining on the surface, although the pores are reduced.

Especially, in case of a thin film disc comprising a substrate and a magnetic layer formed thereon and having a thickness of 0.1 µm or less, pores such as pin-holes on the surface of the substrate (surface defects) become a cause of bit errors during magnetic recording, since a condition of the surface of the substrate is reflected to a surface of the magnetic layer formed thereon.

In Japanese Patent Publication No. 11005/1991, there is described a process for obtaining a disc substrate made of a polyacrylonitrile-based vitreous carbon, a pitch-based vitreous carbon, a lignin-based vitreous carbon, a phenol resin-based vitreous carbon, a furan resin-based vitreous carbon, an alkyd resin-based vitreous carbon, an unsaturated polyester-based vitreous carbon or a xylene resin-based vitreous carbon. This substrate also is lightweight (sp. gr.= 1.5) but has surface defects comprising 5 to more than 10 pores of 2 µm or larger, on the surface per disc-like substrate of 130 mm in diameter, and is not suitable for a substrate for magnetic disc.

OBJECT AND SUMMARY OF THE INVENTION

In view of the above-mentioned problems of the prior art, the objects of the present invention are to provide a substrate for magnetic recording medium, which is light weight and thin, which has excellent mechanical strengths and a smooth and dense surface having no surface defect comprising pore and which can be produced at a low cost; and a process for producing said substrate.

According to the present invention there are provided:

a substrate for magnetic recording medium, consisting essentially of a vitreous carbon produced from a polycarbodiimide resin, and a process for producing a substrate for magnetic recording medium, which comprises molding into an appropriate shape a polycarbodiimide resin or a composition mainly comprising a polycarbodiimide resin, carbonizing the shaped material, and processing the carbonized shaped material into a substrate for magnetic recording medium.

DETAILED DESCRIPTION OF THE INVENTION

The present invention is hereinafter described in detail.

The polycarbodiimide resin used in the present invention is known per se, or can be produced by known processes [reference is made to, for example, U.S. Pat. No. 2,941,956; Japanese Patent Publication No. 33279/1972; J. Org. Chem., 28, 2069-2075 (1963); and Chemical Review 1981, Vol. 81, No. 4, 619-621]. It can easily be produced, for example, by subjecting an organic diisocyanate to a condensation reaction (wherein carbon dioxide is removed) in the presence of a carbodiimidization catalyst.

The organic diisocyanate used in the production of the polycarbodiimide resin can be any of aliphatic type, alicyclic type, aromatic type, aromatic-aliphatic type, etc. They can be used singly or in admixture of two or more (in the latter case, a copolymer is produced).

Examples of the organic diisocyanate are 2,4-tolylene diisocyanate, 2,6-tolylene diisocyanate, a mixture thereof, crude tolylene diisocyanate, xylene diisocyanate, m-phenyl diisocyanate, naphthylene-1,5-diisocyanate, 4,4-biphenylene diisocyanate, 3,3-dimethoxy-4,4-biphenyl diisocyanate, and mixtures thereof.

The polycarbodiimide resin used in the present invention includes homopolymers and copolymers containing at least one recurring unit represented by the following formula

wherein R represents an organic diisocyanate residue.

The above R (organic diisocyanate residue) is preferably an aromatic diisocyanate residue. Herein, "organic diisocyanate residue" refers to an organic diisocyanate moiety which remains when two isocyanate groups (NCO) are removed from one organic diisocyanate molecule. Examples of such a polycarbodiimide resin include the resins represented by the following formulas.

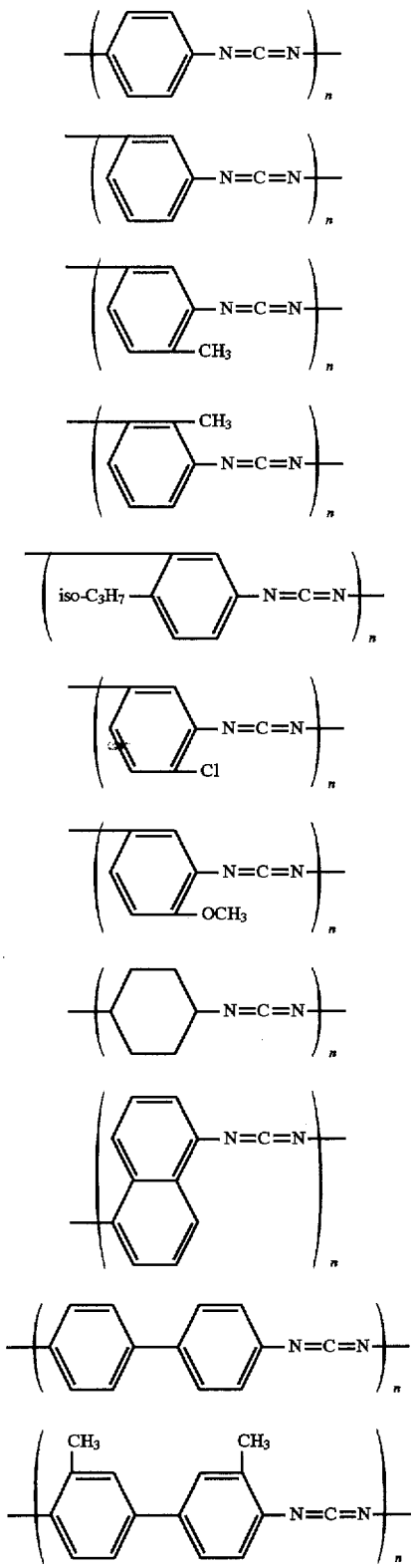

-continued

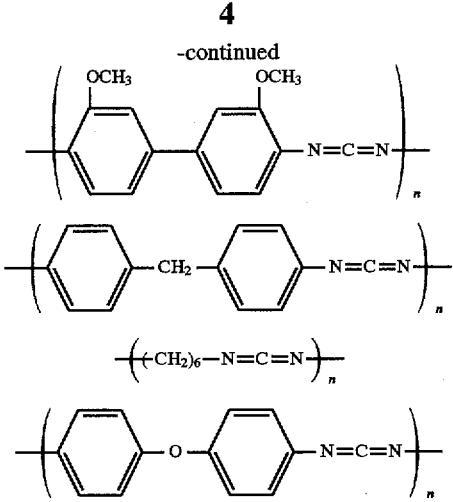

In each of the above formulas, n is 10–10,000, preferably 50–5,000. The terminals of each polycarbodiimide resin may be blocked with a monoisocyanate or the like for control of the molecular weight of the polycarbodiimide resin. Examples of the monoisocyanate are phenyl isocyanate, o-, m- or p-tolyl isocyanate, dimethylphenyl isocyanate, cyclohexyl isocyanate and methyl isocyanate.

The polycarbodiimide resin can be obtained as a reaction mixture containing said resin, or as a powder obtained by precipitating said resin from the reaction mixture. The polycarbodiimide resin, when obtained as a reaction mixture, is used per se or as a powder obtained by removing the solvent and, when obtained as a powder, is used per se or as a solution obtained by dissolution in a solvent.

In the present invention, the polycarbodiimide powder or its solution is first molded into a shaped material, for example, a plate or disc. The molding method is not particularly restricted and can be any method generally used in such molding, such as injection molding, compression molding, casting molding, vacuum molding, extrusion molding or the like.

Then, the shaped material is heated to carbonize the polycarbodiimide resin, whereby an intended vitreous carbon product of a plate or disc shape can be obtained. This carbonization can be conducted in vacuum or in an inert atmosphere such as nitrogen gas or the like. The final firing temperature in the carbonization is preferably 1,000°–3,000° C.

In this firing step, temperature elevation rate to the final carbonization temperature is preferably 2° C./hr or less. Reaching to the final carbonization temperature so rapidly is undesirable, because porosity increases to 0.02% or higher, moreover, pores of 0.1 µm or larger are produced on the surface.

The thus obtained vitreous carbon product of a plate or disc shape derived from a polycarbodiimide resin was light-weight and thin, which has excellent mechanical strengths and very smooth and dense and, when measured for properties, had, for example, a porosity of 0–0.019%, a bulk density of 1.51–1.70 g/cm$^3$ and no pore of 0.1 µm or larger in diameter on the surface. Thus, the vitreous carbon product was an excellent material for magnetic recording medium substrate.

The vitreous carbon product of a plate or disc shape derived from a polycarbodiimide resin is processed so as to have a given inside diameter, a given outside diameter, and further texture processing is conducted to the surface of the substrate for magnetic recording to prevent sticking of a floating surface with the surface of the substrate for magnetic recording when necessary, to obtain a substrate for magnetic recording medium of the present invention. Owing to the above-mentioned excellent properties of the carbonization product, the substrate enables a high recording density, can provide a lightweight recording medium and thereby can make small the motor for recording apparatus, and can make the recording apparatus small and lightweight. Further, the process for producing said substrate according to the present invention is relatively simple and can provide a recording medium of low cost.

Moreover, a substrate for magnetic recording medium of the present invention has no pore of 0.1 µm or larger in diameter (surface defect), and therefore even when this substrate is processed to a thin film disc, bit errors during magnetic recording do not occur.

The present invention is hereinafter described in more detail by way of Examples.

EXAMPLES 1-6

54 g of a 80:20 mixture (TDI) of 2,4-tolylene diisocyanate and 2,6-tolylene diisocyanate was reacted in the presence of 0.12 g of a carbodilmidization catalyst (1-phenyl-3-methylphospholene oxide) in 500 ml of tetrachloroethylene at 120° C. for 5 hours, whereby a polycarbodiimide solution was obtained.

The reaction mixture was poured into a laboratory dish, dried at 60° C. for 20 hours and at 120° C. for 20 hours, and heated to 200° C. at a temperature elevation rate of 1° C./hour to obtain a cured plate. The cured plate was heated to 1,500° C. at a temperature elevation rate of 2° C./hour to obtain a carbon plate.

The carbon plate was processed so as to have a given inside diameter, a given outside diameter and a uniform thickness. The resulting plate was subjected to both-sides simultaneous grinding and both-sides simultaneous polishing with diamond abrasive to prepare a substrate for magnetic recording medium shown in Table 1.

TABLE 1

|  | Outside diameter (mm) | Inside diameter (mm) | Thickness (mm) |
| --- | --- | --- | --- |
| Example 1-1 | 95 | 25 | 1.27 |
| Example 1-2 | 65 | 20 | 0.89 |
| Example 1-3 | 65 | 20 | 0.63 |
| Example 1-4 | 48 | 12 | 0.63 |
| Example 1-5 | 48 | 12 | 0.43 |
| Example 1-6 | 48 | 12 | 0.37 |

The above substrate was measured for (1) surface roughness using a surface roughness tester produced by Tokyo Seimitsu K. K., (2) bulk density, (3) surface pores of 0.1 µm or larger using an optical microscope, (4) Shore hardness and (5) porosity. The results are shown in Table 2. In Table 2, "surface defect" refers to the number of surface pores of 0.1 µm or larger per one substrate.

TABLE 2

|  | Surface Roughness (Å) | | Bulk density (g/cm³) | Surface defect | Shore hardness | Porosity (%) |
| --- | --- | --- | --- | --- | --- | --- |
|  | Ra | Rmax |  |  |  |  |
| Example 1 | 10 | 100 | 1.57 | 0 | 130 | 0 |
| Example 2 | 9 | 80 | 1.56 | 0 | 130 | 0 |
| Example 3 | 9 | 80 | 1.58 | 0 | 130 | 0 |
| Example 4 | 8 | 70 | 1.55 | 0 | 130 | 0 |
| Example 5 | 8 | 70 | 1.58 | 0 | 130 | 0 |
| Example 6 | 8 | 70 | 1.58 | 0 | 130 | 0 |

On the above substrate were formed, by sputtering, a Cr layer, a Co—Ni—Cr alloy layer and a C protective layer in this order to obtain a magnetic recording medium. The medium was evaluated for recording and regeneration properties. The results were good as shown in Table 3.

TABLE 3

|  | Coercive force (Oe) | Remanent magnetic flux density (Br/Bs) |
| --- | --- | --- |
| Example 1 | 1800 | 0.85 |
| Example 2 | 1800 | 0.90 |
| Example 3 | 1900 | 0.90 |
| Example 4 | 1900 | 0.90 |
| Example 5 | 2000 | 0.85 |

50 g of methylene diphenyl diisocyanate (MDI) was reacted in the presence of 0.12 g of a carbodiimidization catalyst (1-phenyl-3-methylphospholene oxide) in 880 ml of tetrahydrofuran at 68° C. for 15 hours, whereby a polycarbodiimide solution was obtained.

The reaction mixture was poured into a laboratory dish, dried at 40° C. for 20 hours and at 120° C. for 40 hours, and heated to 200° C. at a temperature elevation rate of 1° C./hour to obtain a cured plate. The cured plate was heated to 2,000° C. at a temperature elevation rate of 2° C./hour to obtain a carbon plate.

The carbon plate was mechanically processed so as to have the same shape as that in Example 2 to prepare a substrate for magnetic recording medium. The substrate was measured for properties and evaluated for recording and regeneration properties, in the same manners as in Example 2. The results are shown in Table 4 and Table 5.

EXAMPLE 8

54 g of diphenyl ether diisocyanate was reacted in the presence of 0.12 g of a carbodiimidization catalyst (1-phenyl-3-methylphospholene oxide) in 850 ml of tetrahydrofuran at 68° C. for 15 hours, whereby a polycarbodiimide solution was obtained.

The reaction mixture was poured into a laboratory dish, dried at 40° C. for 20 hours and at 120° C. for 30 hours, and heated to 200° C. at a temperature elevation rate of 1° C./hour to obtain a cured plate. The cured plate was heated to 1,800° C. at a temperature elevation rate of 2° C./hour to obtain a carbon plate.

The carbon plate was mechanically processed so as to have the same shape as that in Example 2 to prepare a magnetic recording medium substrate. The substrate was measured for properties and evaluated for recording and regeneration properties, in the same manners as in Example 2. The results are shown in Table 4 and Table 5.

EXAMPLE 9

A carbon plate obtained in Example 1 was heated to 1500° C. at a temperature elevation rate of 1° C./hour, and the carbon plate was mechanically processed so as to have the same shape as that in Example 2 to prepare a magnetic recording medium substrate. The substrate was measured for properties and evaluated for recording and regeneration properties, in the same manners as in Example 2. The results are shown in Table 4 and Table 5.

TABLE 4

|  | Surface Roughness (Å) | | Bulk density (g/cm³) | Surface defect | Shore hardness | Porosity (%) |
| --- | --- | --- | --- | --- | --- | --- |
|  | Ra | Rmax | | | | |
| Example 7 | 4 | 50 | 1.64 | 0 | 135 | 0.01 |
| Example 8 | 5 | 50 | 1.64 | 0 | 135 | 0 |
| Example 9 | 9 | 80 | 1.57 | 0 | 130 | 0 |

TABLE 5

|  | Coercive force (Oe) | Remanent magnetic flux density (Br/Bs) |
| --- | --- | --- |
| Example 7 | 2400 | 0.97 |
| Example 8 | 3000 | 0.98 |
| Example 9 | 1800 | 0.90 |

COMPARATIVE EXAMPLE 1

Using a phenol-formaldehyde resin, a magnetic recording medium substrate was prepared in the same manner as in Example 2. The substrate was measured for properties and evaluated for recording and regeneration properties, in the same manners as in Example 2. The results are shown in Table 6 and Table 7.

COMPARATIVE EXAMPLE 2

Using a mixture of furfuryl alcohol and 0.4 parts by weight of p-toluenesulfonic acid, a magnetic recording medium substrate was prepared in the same manner as in Example 2. The substrate was measured for properties and evaluated for recording and regeneration properties, in the same manners as in Example 2. The results are shown in Table 6 and Table 7.

COMPARATIVE EXAMPLE 3

A carbon plate obtained in Example 1 was heated to 15000° C. at a temperature elevation rate of 5° C./hour, and the carbon plate was mechanically processed so as to have the same shape as that in Example 2 to prepare a magnetic recording medium substrate. The substrate was measured for properties and evaluated for recording and regeneration properties, in the same manners as in Example 2. The results are shown in Table 6 and Table 7.

TABLE 6

|  | Surface Roughness (Å) | | Bulk density (g/cm³) | Surface defect | Shore hardness | Porosity (%) |
| --- | --- | --- | --- | --- | --- | --- |
|  | Ra | Rmax | | | | |
| Comparative Example 1 | 300 | 3000 | 1.49 | 20 | 110 | 3 |
| Comparative Example 2 | 250 | 2000 | 1.45 | 100 | 100 | 3 |
| Comparative Example 3 | 12 | 110 | 1.56 | 10 | 130 | 1.5 |

TABLE 7

|  | Coercive force (Oe) | Remanent magnetic flux density (Br/Bs) |
| --- | --- | --- |
| Comparative Example 1 | 200 | 0.08 |
| Comparative Example 2 | 300 | 0.05 |
| Comparative Example 3 | 1800 | 0.90 |

What is claimed is:

1. A process for producing a substrate for magnetic recording medium, which comprises molding into an appropriate shape a polycarbodiimide resin or a composition mainly comprising a polycarbodiimide resin, thereby producing a shaped material, carbonizing the shaped material at a temperature elevation rate of 2° C./hr or less, and processing the carbonized shaped material into a substrate for magnetic recording medium by simultaneously grinding both sides of said shaped material and by simultaneous polishing of both sides of said shaped material.

2. A process for producing a substrate for magnetic recording medium according to claim 1, wherein said carbonized shaped material is further processed by texture processing of the surface of said substrate.

* * * * *